(No Model.)

T. B. JEFFERY.
VELOCIPEDE HANDLE.

No. 385,715.  Patented July 10, 1888.

Witnesses:
Jean Elliott,
Cora L. Cadwallader

Inventor:
Thomas B. Jeffery,
By Buxton & Buxton
His Attorneys.

UNITED STATES PATENT OFFICE.

THOMAS B. JEFFERY, OF RAVENSWOOD, ILLINOIS.

VELOCIPEDE-HANDLE.

SPECIFICATION forming part of Letters Patent No. 385,715, dated July 10, 1888.

Application filed March 1, 1888. Serial No. 265,780. (No model.)

*To all whom it may concern:*

Be it known that I, THOMAS B. JEFFERY, residing at Ravenswood, county of Cook, and State of Illinois, have invented certain new and useful Improvements in Velocipede-Handles, which are fully set forth in the accompanying specification, reference being had to the drawings forming a part thereof.

Figure 1:
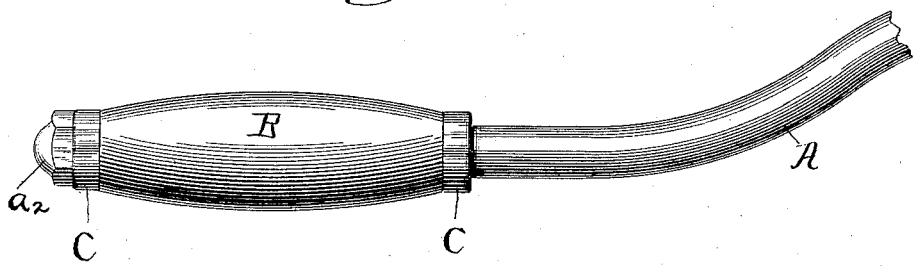
Figure 2:
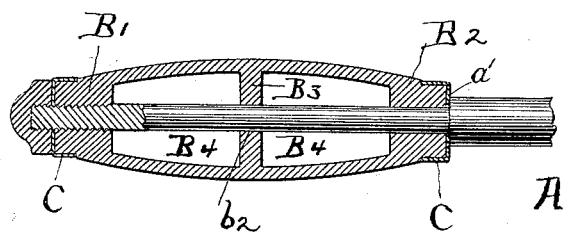
Figure 3:
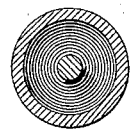
Figure 4:
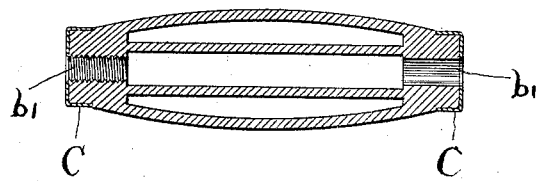
Figure 5:

Figure 1 is a plan of my improved handle and a portion of the handle-bar to which it is secured. Fig. 2 is an axial section through the same. Fig. 3 is a transverse section at the line $xx$ in Fig. 1. Fig. 4 is a longitudinal section of a modified form. Fig. 5 is a transverse section of the same.

A is the handle-bar; B, an integral rubber handle secured thereon.

C C are metal ferrules at the end of the handle B.

Heretofore it has been customary to make handles for velocipedes in the form of a shell having a single longitudinal cavity, through which the handle-bar passes, the bar being secured to the ends of the handle either in the thickened portion formed for that purpose or in the metal ferrule secured upon the handle. It is necessary, in order that the handle should afford the hand convenient grasp, that it should be swelled toward the middle of its length. The customary manner of forming rubber handles with an interior cavity of such shape that the core could not be withdrawn from it after molding, as is the case when the handle, and therefore the cavity, is largest at the middle, is to produce such cavity by placing in the interior of the mold in which the rubber is to be formed and vulcanized a sufficient quantity of liquid, either water or ammonia being commonly employed, which, when the mold is closed and the articles submitted to the vulcanizing process, is vaporized by the heat and expanding forces the rubber into the mold, so that its exterior surface receives all the impressions and outlines of the mold, and the interior cavity is formed as desired. After the vulcanizing process is finished, the inclosed vapor, or the liquid into which it may be condensed in the cooling, is allowed to escape through any small aperture made for that purpose. Rubber handles made in this way are found quite liable to breakage on account of the lack of sufficient power of resistance to exterior pressure at the middle or most enlarged portion. Especially when quite cold they are liable to be broken by any sudden blow.

My invention consists in forming such rubber handle with a rigid diaphragm, dividing the interior space into two or more cavities and constituting a stiffening-rib for the shell.

In order to make a rubber handle with this improvement, a rubber sheet, which forms the outer shell, is laid in the mold in the usual manner, being wrapped round two pieces, which form the ends $B'$ $B^2$ of the handle, and the third piece, $B^3$, which is to form the stiffening-diaphragm or the interior rib, the proper quantity of liquid being placed in each of the spaces $B^4$ $B^4$ between the ends and the middle diaphragm. The mold being then closed and vulcanized in the usual manner, all the pieces, with the shell, unite and the handle becomes entirely integral, having three transverse walls, two being the ends and one the mid-partition. I now drill through all three of these walls longitudinally and allow the liquid or vapor to escape; and through the holes $b'b'$ and $b^2$, I insert the handle-bar A. One of the walls $B'$, $B^2$, and $B^3$ has its aperture threaded, and the handle-bar has a corresponding thread in position to be screwed into the threaded wall, and thereby the handle is secured to the bar, suitable stops being provided, as $a'$, at the inner end of the handle and the nut $a^2$ at the outer end. I prefer to thread the aperture $b'$ in the outer end piece, $B'$, rather than either of the others; but I do not limit myself to that construction. The advantage of it, however, is that the same thread on the handle-bar answers to receive the stop-nut $a^2$, and further obviates the necessity of making it a raised thread, as it would have to be if it were located so as to correspond with either of the other apertures, since the handle must be applied by inserting it over the end of the handle-bar.

Instead of the transverse diaphragm $B^3$, it may sometimes be desirable to adopt a longitudinal diaphragm, as illustrated in Figs. 4 and 5. The method of construction is the same as that above described.

I claim—

1. In a velocipede, an integral rubber handle having two interior cavities and a diaphragm separating them, substantially as set forth.

2. In a velocipede, an integral rubber handle having closed ends and its interior space subdivided by a diaphragm.

3. In a velocipede, an integral rubber handle swelled at the middle and tapering at both ends, and having near the middle a transverse diaphragm integral with the shell and dividing its interior space into two cavities, substantially as set forth.

4. In a velocipede, in combination with the handle-bar, an integral hollow rubber handle having an interior boss at each end and a transverse diaphragm near the middle, separating its interior space into two cavities, substantially as set forth.

5. In a velocipede, an integral rubber handle having three transverse walls and two interior cavities between them, and the handle-bar passing longitudinally through the handle and screwed into one of said transverse walls, substantially as set forth.

6. In a velocipede, in combination with the handle-bar, an integral handle having three transverse walls, which form bearings for the handle-bar, said handle-bar being screwed into one of them, substantially as set forth.

7. In a velocipede, in combination with the handle-bar, an integral rubber handle having three transverse walls and two interior cavities between them, said walls being each pierced longitudinally and affording a bearing for the handle-bar, the outer end wall having its aperture threaded to receive the threaded end of the handle-bar, substantially as set forth.

In testimony whereof I have hereunto set my hand, in the presence of two witnesses, at Chicago, Illinois.

THOS. B. JEFFERY.

Witnesses:
H. M. DUNLOP,
J. J. YOUNG.